United States Patent [19]

McAlpine et al.

[11] Patent Number: 5,067,830
[45] Date of Patent: Nov. 26, 1991

[54] INDENTED TUBE FOR OPTICAL RIBBON

[75] Inventors: Warren W. McAlpine; Dieter Kundis, both of Hickory, N.C.

[73] Assignee: Siecor Corporation, Hickory, N.C.

[21] Appl. No.: 632,159

[22] Filed: Dec. 21, 1990

[51] Int. Cl.$^5$ ................................................ G02B 6/44
[52] U.S. Cl. .................................... 385/114; 385/104; 385/106
[58] Field of Search ....................................... 350/96.23

[56] References Cited

U.S. PATENT DOCUMENTS

| 4,038,489 | 7/1977 | Stenson et al. | 350/96.23 X |
| 4,199,225 | 4/1980 | Slaughter et al. | 350/96.23 |
| 4,456,331 | 6/1984 | Whitehead et al. | 350/96.23 |
| 4,752,112 | 6/1988 | Mayr | 350/96.23 |
| 4,767,184 | 8/1988 | Ogasawara et al. | 350/96.23 |
| 4,846,566 | 7/1989 | Barnett et al. | 350/96.23 |
| 4,848,868 | 7/1989 | Rohner | 350/96.23 |
| 4,930,860 | 6/1990 | Tansey et al. | 350/96.23 |

FOREIGN PATENT DOCUMENTS

| 58-150906 | 9/1983 | Japan | 350/96.23 |
| 2161614 | 1/1986 | United Kingdom | 350/96.23 |
| 2179470 | 3/1987 | United Kingdom | 350/96.23 |
| 2187305 | 9/1987 | United Kingdom | 350/96.23 |

Primary Examiner—John D. Lee
Attorney, Agent, or Firm—J. David Abernethy

[57] ABSTRACT

Disclosed is a tube holding optical fibers or optical ribbons, the tube having indentations in its inner and outer surfaces. The indentations are adjacent to better enable opening of the tube to gain access to the ribbons.

10 Claims, 3 Drawing Sheets

INDENTED TUBE FOR OPTICAL RIBBON

BACKGROUND OF THE INVENTION

The field of the invention is that of optical transmission cables.

Fiber optical cables have received wide acceptance among telecommunications providers. While some optical cables house their optical waveguides loosely within tubes, other optical cables provide ribbons each having a plurality of optical waveguides. Particularly in cables having a large number of optical waveguides, ease of accessibility to the optical waveguides is an important factor in planning systems expected to provide service over long periods of time during which system adjustments and individual failures must be considered.

Many cables provide rip cords to remove a sheath holding optical waveguides. Rip cords are difficult to locate and use effectively if mid-span access is required. Tube slitting or stripping tubes are also used to remove sheaths; great caution must be exercised in their use, because if the sheath is cut too deeply, damage to the optical waveguides may occur. Irregularities in a cable's cross section also must be considered when using such tools.

SUMMARY OF THE INVENTION

Addressing the problems of cable access in mid-span, described is a tube holding an optical waveguide, the tube having a first lengthwise indentation in its outer surface and a second lengthwise indentation in its inner surface adjacent to the first lengthwise indentation. The cable tube may also have a third lengthwise indentation in its outer surface located 180° from the first lengthwise indentation, and a fourth lengthwise indentation in its inner surface located 180° from the second lengthwise indentation. With this arrangement, a tube slitting tool may be used with less danger to optical waveguides within the tube. The optical waveguide may be housed in ribbons or ribbon stacks. In the case of optical fiber ribbons, the ribbons may be oriented such that the inner (second and fourth) lengthwise indentations are adjacent to the middle of a ribbon. If this is the case, it will be advantageous to provide the optical fiber ribbon with an even number of optical waveguides, the distance between the two middle optical waveguides in the ribbon being greater than the distance between any other two adjacent optical waveguides in the ribbon. With this arrangement, even if the ribbon is accidentally nicked by the tube slitting tool, it may fall within the region between the two middle optical waveguides, not damaging any of the optical waveguides themselves.

BRIEF DESCRIPTION OF THE DRAWINGS

The preferred embodiment is described with reference to the accompanying drawings, in which.

DETAILED DESCRIPTION OF THE PREFERRED EMBODIMENT

Figure 1:
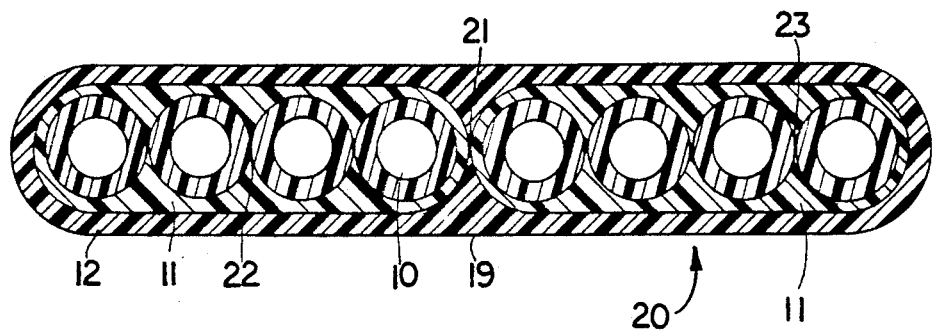
FIG. 1 is a cross sectional view of an optical waveguide ribbon.

Optical waveguide ribbon 20 in FIG. 1 consists of eight optical waveguides 10 and urethane acrylate coatings 11, 12. The left four optical waveguides 10 and the right four optical waveguides 10 receive coatings 11 in side by side extrusions in which the right four optical waveguides are maintained in an end to end touching relation 23 and the left four optical waveguides are maintained in an end to end touching relation 22. Coating 12 is then extruded over coatings 11 in the same processing line. Since the middle optical waveguides are separated by two layers of coating 11, the distance between them is greater than the distance between any other two adjacent optical waveguides.

Figure 2:
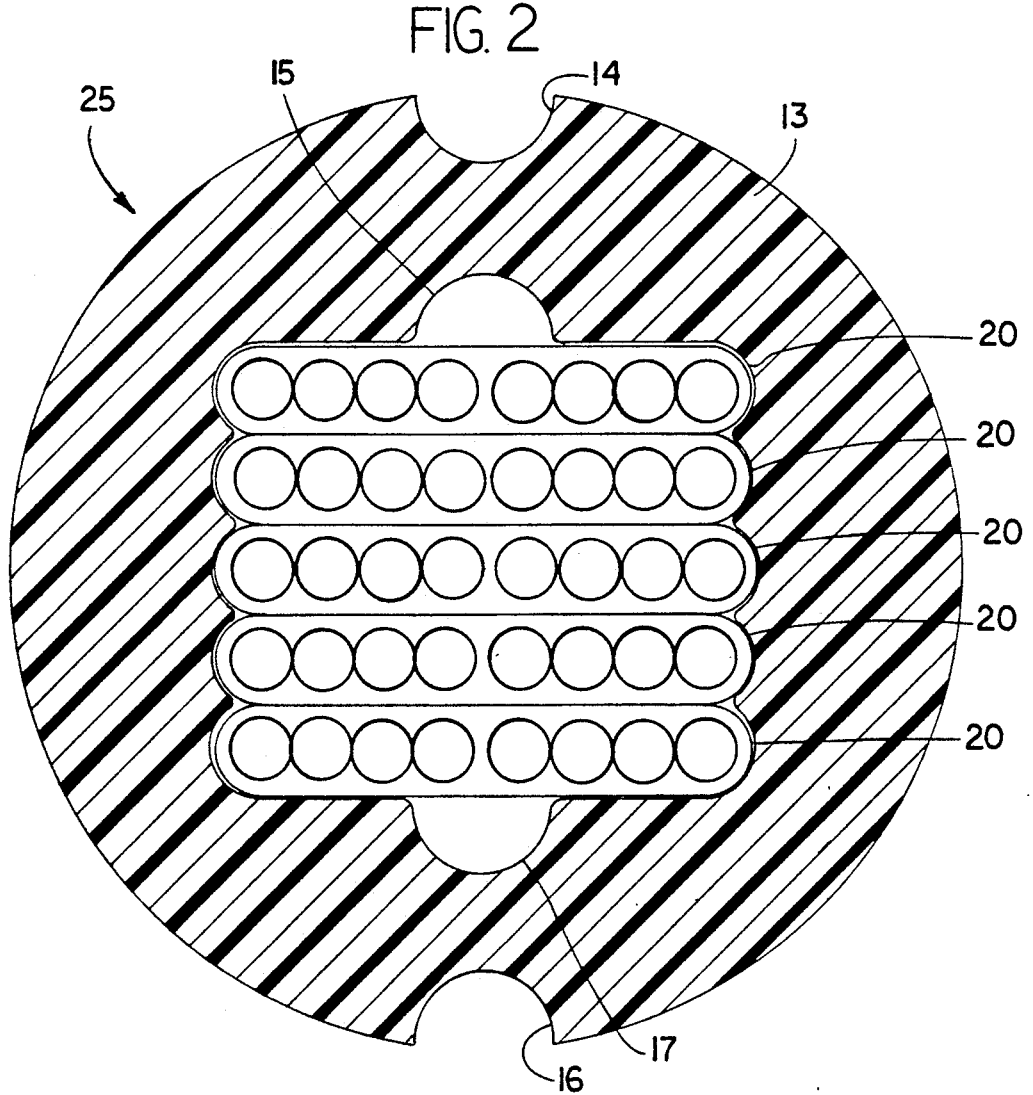
FIG. 2 is a cross sectional view of a cable element including a stack of ribbons as shown in FIG. 1.

Optical cable element 25 in FIG. 2 consists of thermoplastic tube 13 circumscribing a stack of optical waveguide ribbons 20. Tube 13 has longitudinal recesses 14, 16 in its outer surface and longitudinal recesses 15, 17 in its inner surface, with recess 15 adjacent to recess 14 and recess 17 adjacent to recess 16. Tube 13 can be slit through recesses 14, 15, reducing the risk of damage to ribbons 20. Ribbons 20 are oriented such that indentations 15, 17 are next to middle section 19 of a ribbon.

Figure 3:
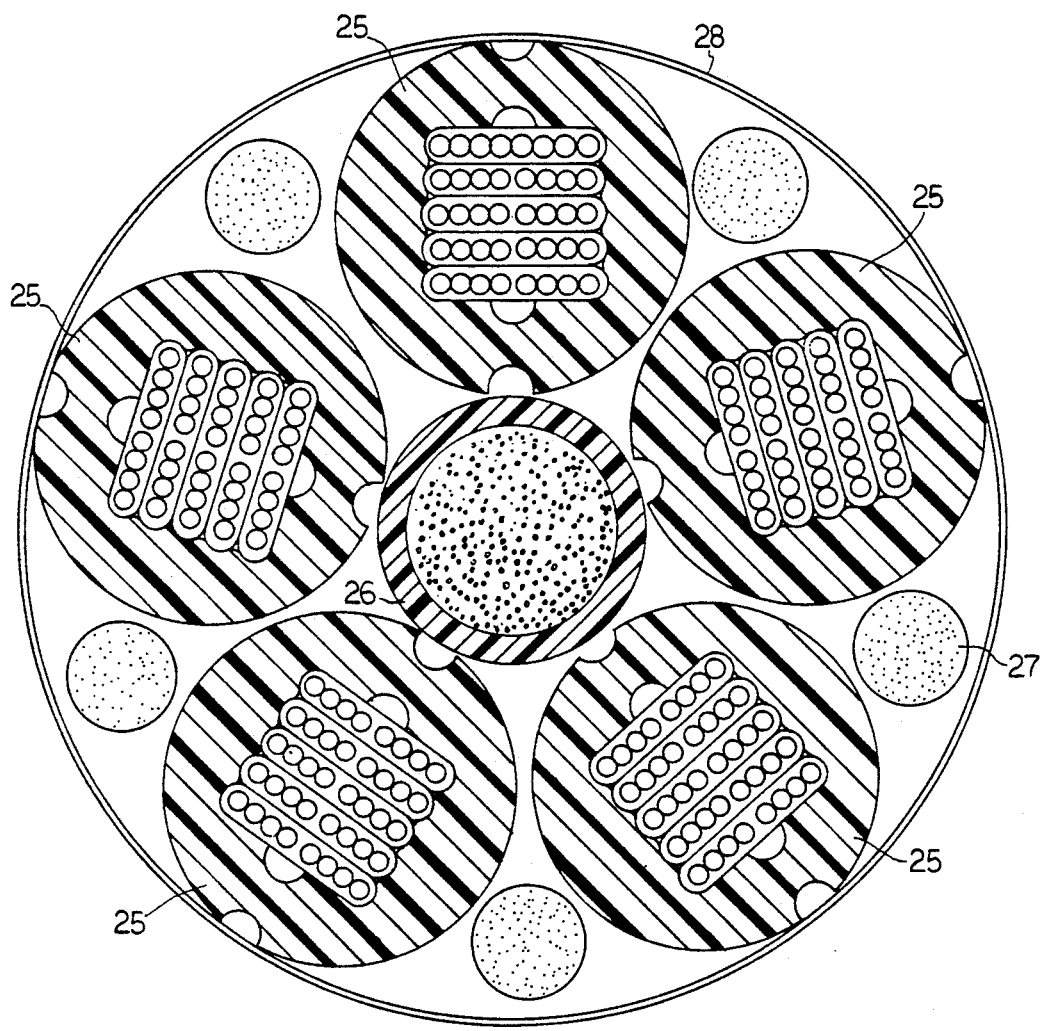
FIG. 3 is a cable core comprising a plurality of cable elements as shown in FIG. 2.

An example of a cable core having a plurality of elements 25 is shown in FIG. 3. Within binder tape 28 are elements 25 and waterblocking materials 27 stranded about central glass reinforced plastic member 26.

Figure 4:
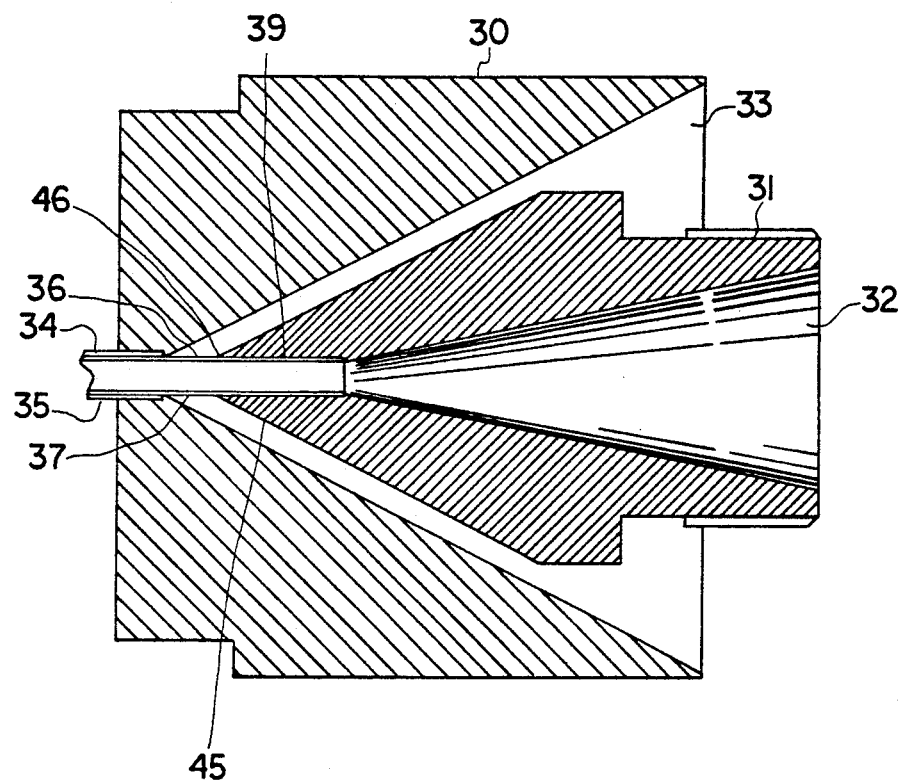
FIG. 4 is a longitudinal sectional view of a tip and die used in manufacture of the element shown in FIG. 2; and, FIG. 5 is an end view of the apparatus shown in FIG. 4.
Figure 5:
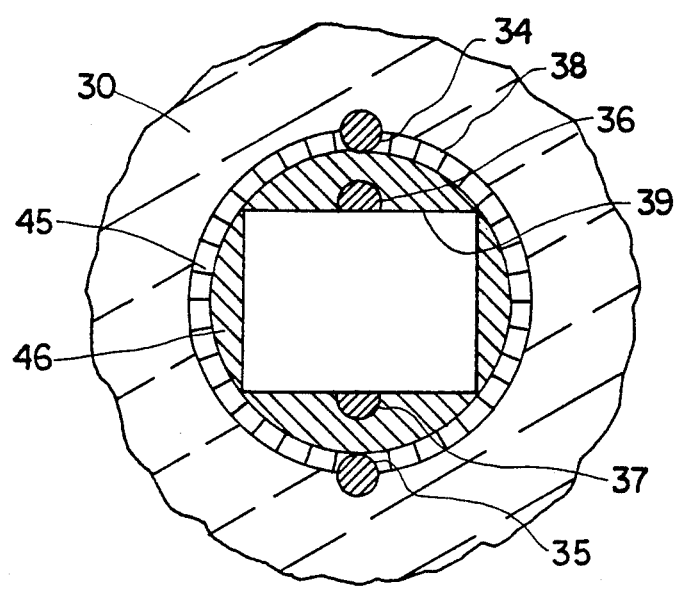

Tube 13 may then be manufactured using the tip and die extrusion apparatus shown in FIGS. 4 and 5. Tip 31 has rod sections 36, 37 mounted to its passage 39 and extending through the central passage of die 30. The exterior section 45 of tip 31 is cone shaped and its end surface 46 is flat. Die 30 has rod sections 34, 35 mounted to its inner passage. During processing, ribbons 20 proceed through tip interior 32 to passage 39 and molten thermoplastic 13 is extruded through melt passage 33, surrounding ribbons 20 and rods 36, 37. Rods 36, 37 thus form recesses 15, 17. Rods 34, 35 form recesses 14, 16 when the melt proceeds through exit 38 of die 30.

What is claimed is:

1. An optical cable element, comprising:
   (a) a tube having a first lengthwise indentation in its outer surface and a second lengthwise identation in its inner surface adjacent to the first lengthwise indentation; and
   (b) an optical waveguide within the tube.

2. an optical cable element as recited in claim 1, wherein the tube has a third lengthwise indentation in its outer surface located 180° from the first lengthwise indentation and a fourth lengthwise indentation in its inner surface located 180° from the second lengthwise indentation.

3. An optical cable element, comprising:
   (a) a tube having a first lengthwise indentation in its outer surface and a second lengthwise indentation in its inner surface adjacent to the first lengthwise indentation; and
   (b) an optical waveguide ribbon within the tube.

4. An optical cable element as recited in claim 3, wherein the tube has a third lengthwise indentation in its outer surface located 180° from the first lengthwise indentation and a fourth lengthwise indentation in its inner surface located 180° from the second lengthwise indentation.

5. An optical cable element as recited in claim 4, wherein the optical waveguide ribbon is oriented such that the second lengthwise indentation is next to the middle of the ribbon.

6. An optical cable element as recited in claim 5, wherein the optical waveguide ribbon has an even number of optical waveguides.

7. An optical cable element as recited in claim 6, wherein the space between the two middle optical waveguides in the ribbon is greater than the distance between any other two adjacent optical waveguides in the ribbon.

8. An optical cable element as recited in claim 3, wherein the optical waveguide ribbon is oriented such that the second lengthwise indentation is next to the middle of the ribbon.

9. An optical cable element as recited in claim 8, wherein the optical waveguide ribbon contains an even number of optical waveguides.

10. An optical cable element as recited in claim 9, wherein the distance between the two middle optical waveguides in the ribbon is greater than the distance between any other two adjacent optical waveguides in the ribbon.

* * * * *